United States Patent [19]
Goldbach et al.

[11] Patent Number: 5,830,559
[45] Date of Patent: Nov. 3, 1998

[54] PANELLING FOR VEHICLE BODIES

[75] Inventors: Hubert Goldbach, Ratingen; Boris Koch, Wermelskirchen; Thomas Malek, Pulheim; Adolf Marold, Böblingen; Alexander Pothoven, Weissach/Flacht; Ralf Freischläger, Leonberg, all of Germany

[73] Assignees: Bayer Aktiengesellschaft; MC Micro Compact Car Aktiengesellschaft, both of Germany

[21] Appl. No.: 583,183

[22] Filed: Jan. 4, 1996

[30] Foreign Application Priority Data

Jan. 12, 1995 [DE] Germany .......................... 195 00 641.0
Nov. 30, 1995 [DE] Germany .......................... 195 44 668.2

[51] Int. Cl.[6] ....................................................... B32B 9/00
[52] U.S. Cl. ............................ 428/192; 428/31; 428/76; 428/99; 428/122; 428/124; 428/133; 428/196; 296/191; 49/501; 49/503
[58] Field of Search .............................. 428/99, 192, 196, 428/411.1, 76, 122, 133, 124, 121, 126, 31; 296/191; 52/581, 581.1, 539, 543, 546, 394; 49/501, 503, 502; 160/391; 29/505, 521

[56] References Cited

U.S. PATENT DOCUMENTS

| 1,764,668 | 6/1930 | Woodall et al. . |
| 1,960,949 | 5/1934 | Miller et al. . |
| 2,466,190 | 4/1949 | Westman et al. . |
| 3,862,490 | 1/1975 | Tsuneishi et al. .......................... 29/505 |
| 4,744,185 | 5/1988 | Lamberet et al. ................... 52/309.11 |
| 5,050,351 | 9/1991 | Goldbach et al. ......................... 49/502 |
| 5,090,762 | 2/1992 | Krieger . |
| 5,111,619 | 5/1992 | Billin et al. . |

Primary Examiner—Patrick Ryan
Assistant Examiner—Abraham Bahta
Attorney, Agent, or Firm—Connolly & Hutz

[57] ABSTRACT

The present invention relates to dismountable vehicle panelling, and in particular a system for connecting vehicle body parts and panelling sections which are used as panelling for load-bearing supporting structures of vehicles.

7 Claims, 5 Drawing Sheets

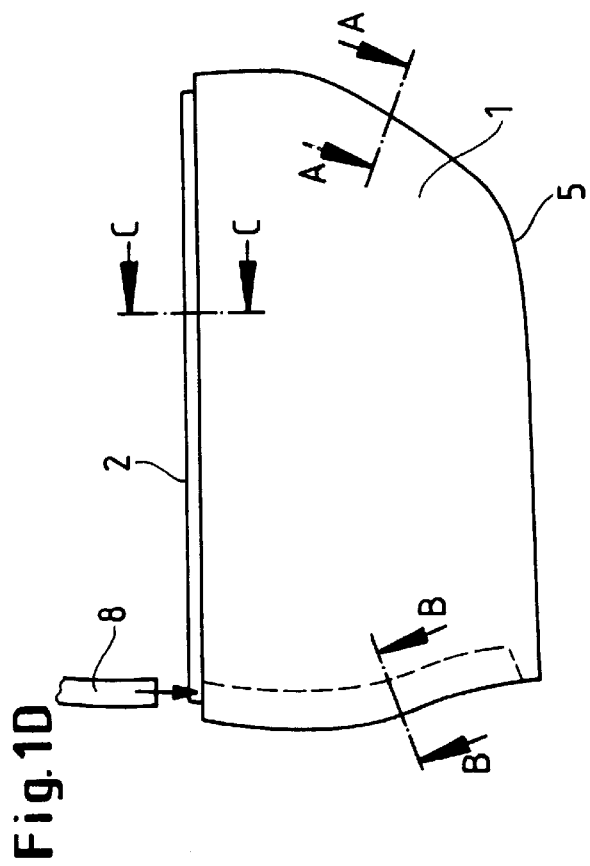
Fig.1D
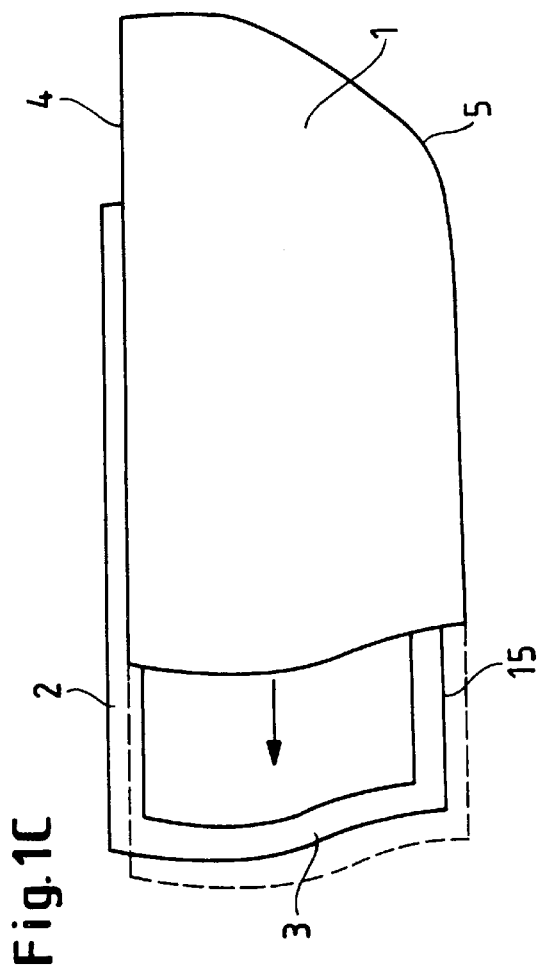
Fig.1C
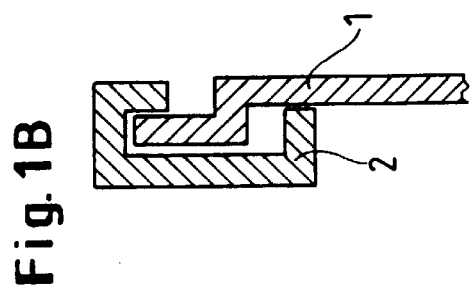
Fig.1B
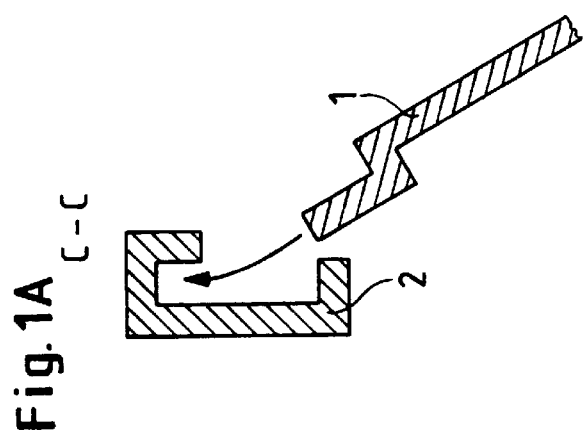
Fig.1A C-C

A - A

PANELLING FOR VEHICLE BODIES

BACKGROUND OF THE INVENTION

The present invention relates to dismountable panelling for vehicle bodies, and in particular a system for connecting vehicle body parts and panelling sections—hereinafter referred to as panelling—covering the load-bearing substructures (supporting structures) of vehicles. The panelling can be used particularly for the assembly or disassembly of vehicle body panelling on a mass production scale. The panelling compensates any fabrication tolerances and/or dimensional variations due to fluctuations in temperature which have to be taken into account when producing panelling for supporting structures.

At present the following solutions are known for connecting panelling sections and load-bearing supporting structures which differ greatly in their thermal expansion properties:
1. The panelling is fastened by means of screws in elongated holes in the panelling; these holes allow the panelling to expand in one direction.
2. The panelling is fastened by means of friction bearings which are held in the supporting structure by means of screws or rivets and provide a sliding attachment together with a corresponding counter-bearing in the panelling: This allows the panelling to expand freely in one direction, and if a double bearing is used, in two directions.
3. The panelling is fastened by means of threaded bolts integrated in the panelling and flanges provided with elongated holes in the supporting structure. This method of fastening allows the panelling to expand freely in one direction.
4. The panelling is fastened by means of a fixed screw connection via integrated flexural flanges in the panelling. This also allows the panelling to expand freely in one direction.

All the abovementioned fastening systems require an additional seal between the panelling and the supporting structure in order to prevent the penetration of splashed water and dust and the occurrence of rattling or creaking noises between the panelling and the supporting structure.

German Patent DE 39 35 857 C1 describes a vehicle door in which a door panel is attached to a supporting base and a corresponding pair of edges of the door panel and the base contains grooves whose openings face each other and which are connected to each other by a shaped strip. This fastening system allows the base and the door panel to be detachably connected to each other.

The above fastening system has the disadvantage that when the door panel reaches a higher temperature than the base, for example as a result of differences in the thermal expansion of the materials, the connection is no longer sufficiently secure to prevent, for example, undesirable disassembly. There is therefore possibly no longer any guarantee that the vehicles concerned cannot be broken into.

SUMMARY OF THE INVENTION

The present invention is based on the problem of developing a fastening system in which rigid supporting structures are covered with large-area panelling. The system should be simple to handle and capable of being assembled and disassembled economically during the production process. Important criteria are the prevention of vehicles being broken into, impenetrability to dust and water and the avoidance of rattling and creaking noises. The fastening system must not cause any visible marks to appear on the visible surface of the panelling.

According to the invention the above problem is solved by vehicle body panelling consisting of at least one panel and a supporting structure, characterised in that the panel has folded edges along its peripheral edge which interlock over fastening edges of the supporting structure and form a connection in the form of a groove and tongue combination with an intermediate shaped member.

Particularly where four additional fastening connections are used the panelling according to the invention allows the free longitudinal expansion $\Delta L$ thereof in two directions (referred to as the x and z directions in the present context), while the panelling is fixed throughout the whole length of its periphery in a third direction (referred to as the y direction in the present context).

In one preferred embodiment the panelling is unidirectionally fixed in position in relation to the supporting structure by means of four additional fastening points—one on each side of the panelling. The fastening connections are designed in such a manner that one pair of fastening connections are firmly fixed in the z and y directions, while being movable in the x direction, and one pair is firmly fixed in the x and y directions but is movable in the z direction, so that an imaginary absolute fixed point is formed in the centre of the panelling.

The following advantages over the prior art are obtained with the system developed for fastening the panelling. The special structural design of the peripheral edges of the panelling and of the additional shaped member facilitates handling during the assembly and disassembly of the panelling. Particularly when only one shaped securing member or possibly two shaped securing members are used a shorter assembly or disassembly time is required. The fastening does not require any additional tools during assembly or disassembly. The design is particularly space-saving and guarantees the absence of any play in the fastening of the panelling over the entire length of its peripheral edges, thereby providing improved break-in security, improved impenetrability to dust and splashed water and a uniform distribution of forces over the surface of the panelling.

The main advantage of the vehicle body panelling according to the invention is the fact that the panelling can expand freely in two directions. The resulting extremely low structural tensions at extremely low or high temperatures (−30 to +150° C.) are the best possible prerequisites for avoiding distortion of the surface of the panelling.

In addition, the preferred panelling provides two additional advantages as a result of the imaginary point of fixation to the supporting structure in the centre of the surface of the panelling:

The longitudinal expansion of the panelling is evenly distributed over all the connecting joints.

It is not possible for the panelling to become distorted in relation to the supporting structure. Thus a uniform overall attachment is always guaranteed.

Methods known in principle can be used for the production of the peripheral edges of the panelling and the supporting structure: compression moulding, deep drawing, flow moulding or injection moulding, depending on which material is used for the panelling or for the supporting structure.

Depending on the material used, the intermediate shaped securing members can be produced by extrusion or injection-moulding processes.

Deep-drawable metal sheets of steel or aluminium as well as moulded parts of thermosets or thermoplastics can be used as the material for the production of the panelling, particularly when it has an integrated fastening means on its peripheral edges. Thermoplastics, elastomers, rubber or silicones are suitable basic materials for the additional shaped member(s).

The vehicle body panelling according to the invention is universally suitable for all types of vehicle body coverings, and in particular for the panelling of vehicle body structures of passenger cars or lorries.

BRIEF DESCRIPTION OF THE DRAWINGS

The invention is explained in more detail in the following with the aid of the figures:

FIGS. 1a to d are diagrams illustrating the assembly of one embodiment of the panelling according to the invention (a vehicle door)

EXAMPLES

Figure 2:
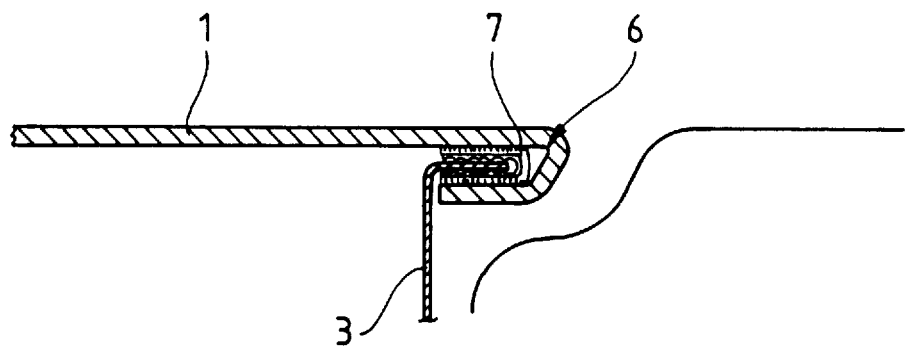
FIG. 2 is a cross-section through a fastening edge of a vehicle body part according to the invention, FIGS. 3a and b are sections through the panelling according to FIG. 1d along line B—B for different longitudinal thermal expansion values ΔL of the panelling.

In the following the vehicle body panelling according to the invention is illustrated with the aid of dismountable vehicle body sections of a vehicle door panel. Bearing in mind the joining direction and the design specifications the following fastening system can be used for a number of vehicle body parts (such as for example boot lids, rear doors and vehicle roofs), or for example for the external casings of electrical appliances.

In drawings 1a to d of FIG. 1 the assembly procedure is illustrated chronologically. The upper edge 4 of the door panel 1 is inserted at an angle into a shaped guide rail 2 (FIG. 1a; section according to line C—C of FIG. 1c) which is connected to supporting structure 3 and then pressed against the supporting structure 3 (see FIG. 1b) or inserted from the side over the entire length (see FIG. 1c).

The connection between the upper edge 4 of the door panel 1 and the shaped guide rail 2 allows the door panel 1 to be pushed in a longitudinal direction. The door panel 1 (see FIG. 1d) is pushed along until the lower edge 5 of the panelling is connected by means of the undercut 6 (see FIG. 2) to the supporting structure 3 which has previously been provided with a shaped rubber member 7.

Figure 3A:
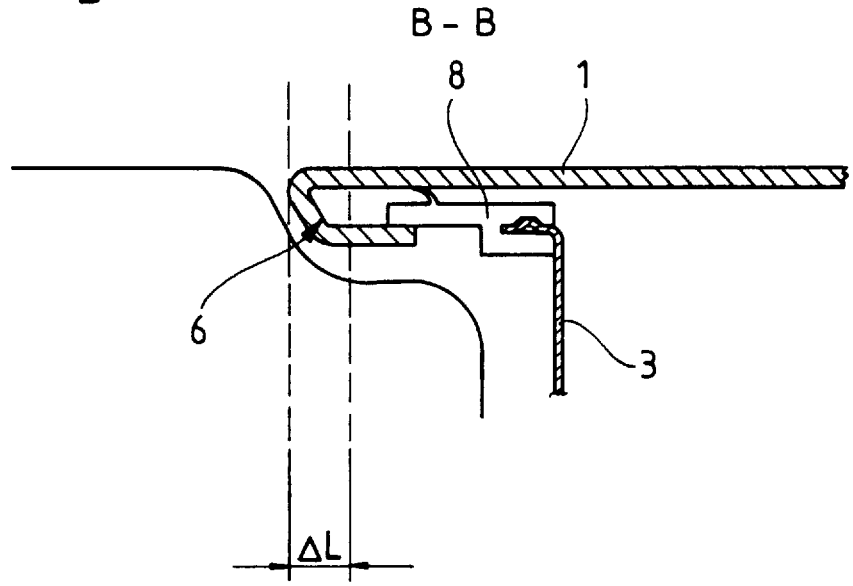
Figure 3B:
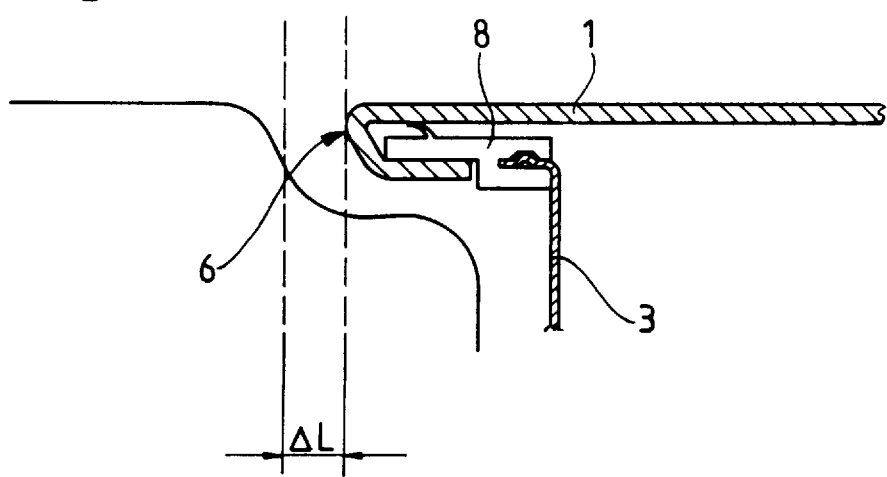

Then an additional flexible shaped securing strip 8 (see FIG. 1d) is pushed from above between the undercut 6 and the supporting structure 3 (see FIG. 3), so that the entire peripheral edges of the door panelling are fastened in a floating manner to the supporting structure 3, so as to guarantee the required play, impenetrability, break-in security and compensation of the longitudinal thermal expansion ΔL.

Figure 4:
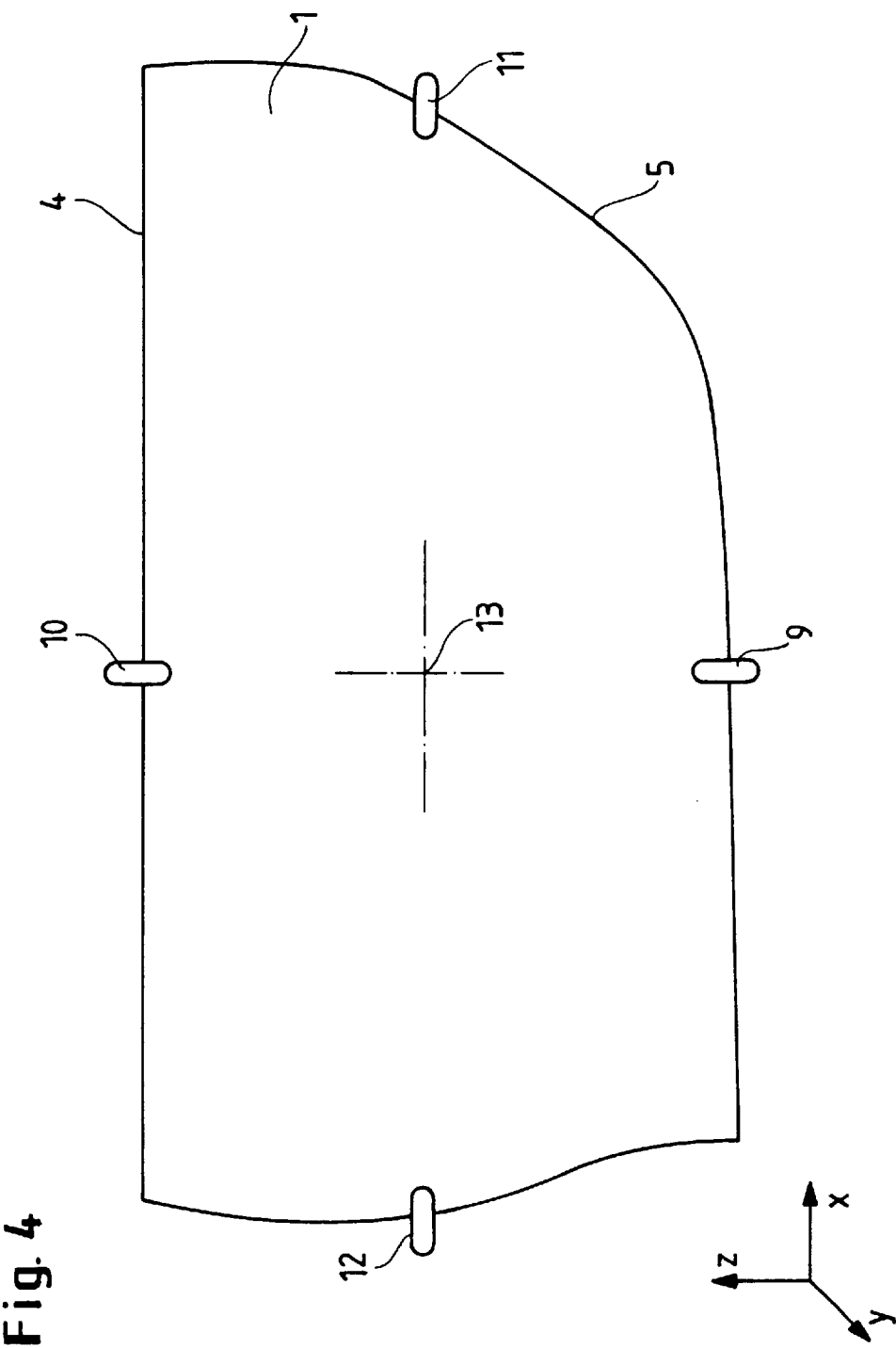
FIG. 4 is a diagram of one method of fastening the panelling according to FIG. 1d in order to explain the imaginary fastening point.

In order to prevent any uncontrolled expansion in different directions or any distortion of the door panelling 1 on the supporting structure 3, the door panel 1 is additionally fastened in a conventional manner at four additional points (see for example FIG. 4) (e.g. with screws, press studs, rivets or centring ribs). These four additional fastening connections each allow movement in one or two directions (x or z).

This is made possible by elongated holes 9, 10, 11 and 12, which determine the direction of free movement. This ensures that the door panel cannot move uncontrollably along the understructure 3 and has an imaginary point of fixation 13 in the centre of the surface. Depending on the location of the elongated holes 9, 10, 11 and 12, the imaginary point of fixation 13 can be located as required at any desired point of the surface of the panelling.

Figure 5:
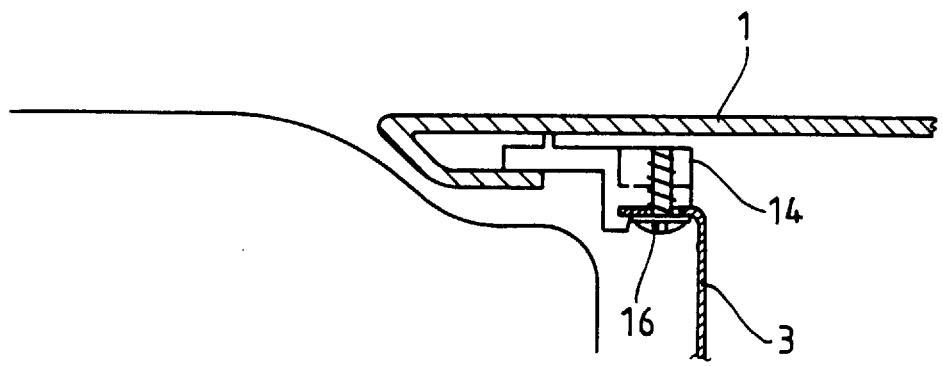
FIG. 5 is one variant of the connection between the supporting structure, the shaped member and the panel according to section B—B of FIG. 1d.

One variant of the extruded flexible shaped strip 8 which can also be used is an injection-moulded shaped member 14 which is previously placed in the undercut 6 and after reaching the end position of the door panel 1 (see for example FIG. 5) is fastened to the supporting structure 3 (for example by means of screws. 16 or press studs, etc.).

We claim:

1. Vehicle body panelling comprising at least one panel and a supporting structure for the panel, the panel having U-shaped edges along a peripheral edge, and the supporting structure having fastening edges that interlock with the U-shaped edges of the panel to thereby form a tongue and groove connection, and an intermediate shaped member between the U-shaped edges of the panel and the fastening edges of the supporting structure.

2. Vehicle body panelling according to claim 1, including at least two mutually opposing additional detachable connections between the supporting structure and the peripheral edge of the panel.

3. Vehicle body panelling according to claim 1, characterised in that the panel is fixed at additional points along the peripheral edge.

4. Vehicle body panelling according to claim 1, including four detachable connections between the panel and the supporting structure arranged in pairs on mutually opposing peripheral edges of the panel.

5. Vehicle body panelling according to claim 1, wherein the intermediate shaped member is in the form of an insertable elastic shaped securing member.

6. Vehicle body panelling according to claim 1, wherein the intermediate shaped member connects the panel and the supporting structure to each other in a manner which is impenetrable to splashed water and is free from expansion.

7. Vehicle body panelling according to claim 1, characterised in that metal sheets of steel or aluminum or thermosetting and/or thermoplastic sheetlike plastic mouldings are used as the material for the panel or for the supporting structure.

* * * * *

UNITED STATES PATENT AND TRADEMARK OFFICE
CERTIFICATE OF CORRECTION

PATENT NO. : 5,830,559
DATED : November 3, 1998
INVENTOR(S) : Hubert Goldbach, et al.

It is certified that error appears in the above-identified patent and that said Letters Patent is hereby corrected as shown below:

Column 4, line 34 (Claim 1, line 8), "does" should read -- edges --.

Signed and Sealed this

Twenty-third Day of March, 1999

*Attest:*

Q. TODD DICKINSON

*Attesting Officer*       *Acting Commissioner of Patents and Trademarks*